United States Patent [19]

Nakamura

[11] Patent Number: 5,220,833
[45] Date of Patent: Jun. 22, 1993

[54] DETECTING CIRCUIT FOR A VIBRATING GYROSCOPE

[75] Inventor: Takeshi Nakamura, Nagaokakyo, Japan

[73] Assignee: Murata Manufacturing Co., Ltd., Japan

[21] Appl. No.: 750,887

[22] Filed: Aug. 26, 1991

[30] Foreign Application Priority Data

Aug. 27, 1990 [JP] Japan ................................. 2-225846
Aug. 27, 1990 [JP] Japan ................................. 2-225847

[51] Int. Cl.$^5$ ............................................. G01P 9/04
[52] U.S. Cl. ...................................... 73/505; 310/316
[58] Field of Search ................... 73/497, 505, 504; 310/329, 316

[56] References Cited

U.S. PATENT DOCUMENTS 3,520,195  7/1970  Tehon ................................... 73/505

FOREIGN PATENT DOCUMENTS 2-80911  3/1990  Japan ................................... 73/504

*Primary Examiner*—John E. Chapman
*Attorney, Agent, or Firm*—Ostrolenk, Faber, Gerb & Soffen

[57] ABSTRACT

A detecting circuit according to the present invention is for detecting output of a vibrating gyroscope including a prism-shaped vibrator and piezoelectric elements formed on, at least, two side faces of the vibrator. The detecting circuit comprises an exciting signal generating circuit for exciting the vibrator by inputting the signal to the two piezoelectric elements of the vibrating gyroscope. The vibrating gyroscope bends and vibrates in response to the signal from the exciting signal generating circuit. A difference between the outputs of the two piezoelectric elements of the vibrating gyroscope is detected by a differential circuit. The output signal from the differential circuit is subjected to synchronous detection by a synchronous detecting circuit. Furthermore, when necessary, a phase adjusting circuit for adjusting phase of the output signal from the differential circuit is connected to the synchronous detecting circuit.

6 Claims, 8 Drawing Sheets

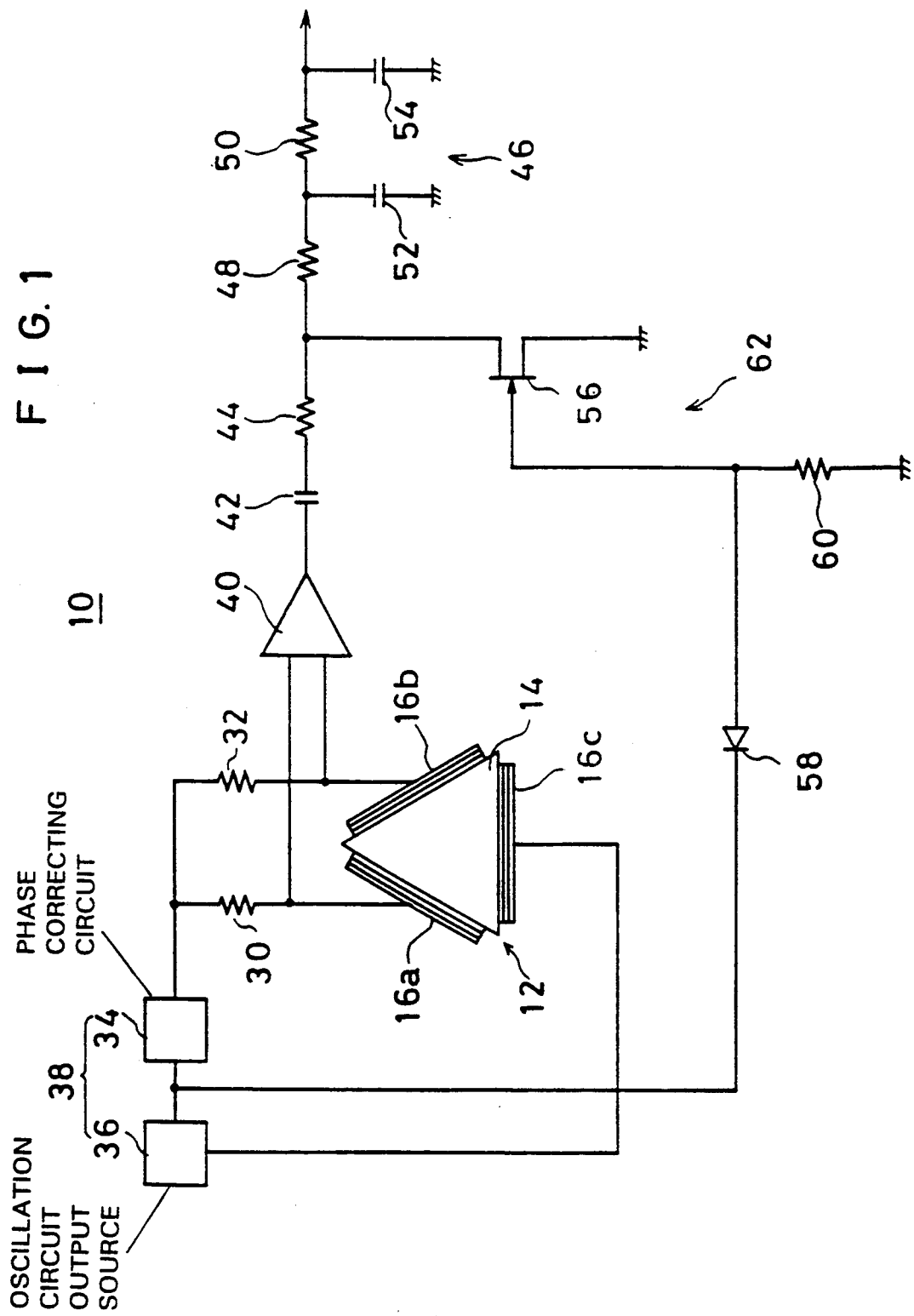

F I G. 10 A
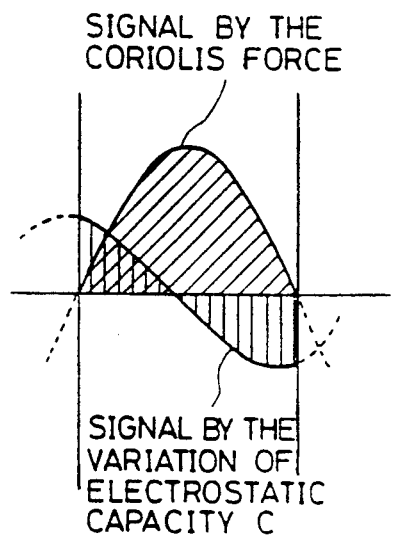
F I G. 10 B
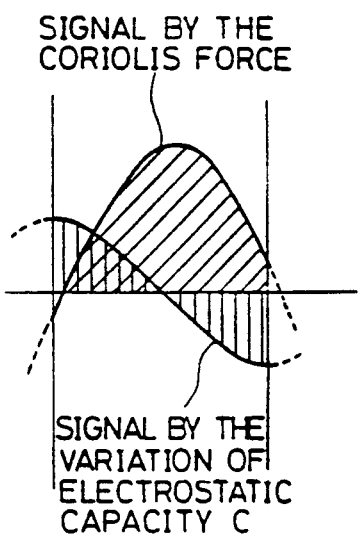
F I G. 11
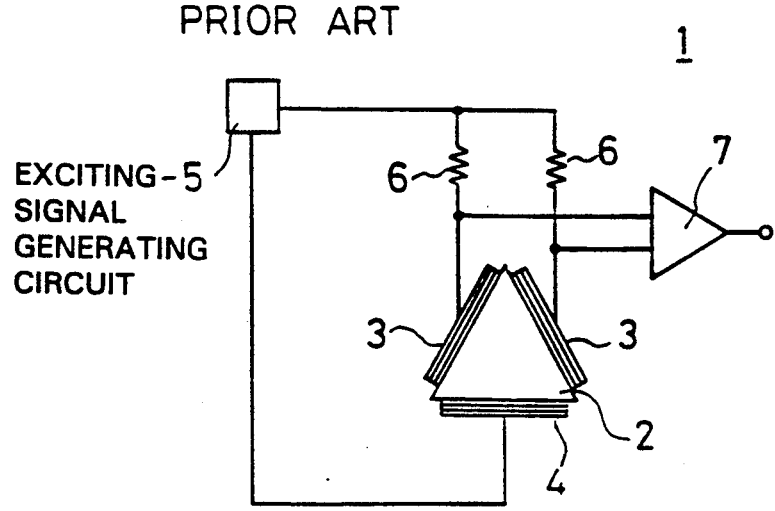
PRIOR ART

DETECTING CIRCUIT FOR A VIBRATING GYROSCOPE

BACKGROUND OF THE INVENTION

1. Field Of the Invention

The present invention relates to a detecting circuit. More particularly, it relates to a detecting circuit for detecting, for example, an output of a prism-shaped vibrating gyroscope.

2. Description of the Prior Art

FIG. 11 is a circuit diagram showing an example of a conventional detecting circuit which constitutes a background of the present invention. The detecting circuit 1 is used for detecting, for example, an output of a prism-shaped vibrating gyroscope.

Between two piezoelectric elements 3 and the other piezoelectric element 4 of the vibrating gyroscope 2, an exciting signal generating circuit 5 is connected. In this case, the exciting signal generating circuit 5 is connected respectively to the two piezoelectric elements 3 of the vibrating gyroscope 2 via resistances 6. Meanwhile, outputs of these piezoelectric elements 3 are inputted to a differential amplifying circuit 7.

The vibrating gyroscope 2 is subjected to a bending vibration in a direction orthogonal to the main surface of the other piezoelectric element 4 by the exciting signal generating circuit 5. At this time, by adjusting the signals generated by the electrostatic capacity difference between the two piezoelectric elements 3 to be equal to each other, the output from the differential amplifying circuit 7 becomes 0.

If the vibrating gyroscope 2 is rotated about its axis, the Coriolis force is exerted in a direction orthogonal to the vibrating direction of the vibrating gyroscope 2. Accordingly, the vibrating direction of the vibrating gyroscope 2 is shifted from the vibrating direction of the non-rotating state. Thus, an output difference is produced between the two piezoelectric elements 3 and the output is obtained from the differential amplifying circuit 7. The output corresponds to the rotational angular velocity. Accordingly, the rotational angular velocity applied to the vibrating gyroscope 2 can be detected by measuring the output of the differential amplifying circuit.

The electrostatic capacity of the piezoelectric element, however, changes with atmospheric temperature and variations with time, and thus the output from the differential amplifying circuit does not become 0 even during non-rotation and results in a measurement error. In this case, as shown in FIG. 12, besides the signal outputted by the Coriolis force, the signal outputted by the variations in the electrostatic capacity of the piezoelectric element is inputted to the differential amplifying circuit 7. Therefore, a composite signal of these signals is outputted from the differential amplifying circuit 7 and the rotational angular velocity can not be measured accurately.

SUMMARY OF THE INVENTION

It is, therefore, a primary object of the present invention to provide a detecting circuit in which a measurement error due to atmospheric temperature and variations with time hardly occurs.

The present invention is directed to the detecting circuit for detecting the output of a vibrating gyroscope including a prism-shaped vibrator and piezoelectric elements formed, at least, on two side faces of the vibrator. The detecting circuit comprising: an exciting signal generating circuit for exciting the vibrator by inputting the signal to the two piezoelectric elements; a differential circuit for detecting an output difference of the two piezoelectric elements to which the exciting signal generating circuit is connected, a synchronous detecting circuit for synchronizing and detecting the output signal from the differential circuit and a smoothing circuit for smoothing the signal which is synchronized and detected by the synchronous detecting circuit.

Furthermore, in the detecting circuit, a phase adjusting circuit for adjusting an output signal phase from the differential circuit may be added to the synchronous detect circuit.

Due to the electrostatic capacity of the piezoelectric element, a driving signal of the piezoelectric element becomes a lagging signal as compared with the detecting signal, because of the output impedance of the exciting signal generating circuit and the input impedance of the differential circuit. An output of the Coriolis force becomes a leading signal as compared with the exciting signal. Accordingly, the driving signal of the piezoelectric element and the output by the Coriolis force have a phase difference of 90°. In the synchronous detecting circuit, the detection is conducted is synchronism with the output of the Coriolis force. The phase of the signal detected by the synchronous detecting circuit is adjusted by the phase adjusting circuit. Signals subjected to synchronous detection are smoothed by the smoothing circuit.

According to the present invention, since the detection is conducted in synchronism with the output of the Coriolis force, the driving signal having the phase difference of 90° with respect thereto is offset by the positive and negative portions. Therefore, errors caused by the variations in electrostatic capacity of the piezoelectric element are eliminated, and an accurate output responsive to the rotational angular velocity can be obtained. Accordingly, the rotational angular velocity applied to the vibrating gyroscope can be detected accurately.

Meanwhile, by adding the phase adjusting circuit to the detecting circuit, the phase of the signal being detected is adjusted such that the signal by the variation in the electrostatic capacity is correctly offset. Accordingly, even when there is no phase difference of 90° between the driving signal of the piezoelectric element and the output of the Coriolis force, only the output responsive to the rotational angular velocity can be measured.

The above and other objects, features, aspects and advantages of the present invention will become more apparent from the following detailed description of the preferred embodiment in connection with the accompanying drawings.

BRIEF DESCRIPTION OF THE DRAWINGS

FIG. 1 is a circuit diagram showing one embodiment of the present invention.

FIG. 10A is a wave form diagram showing a state wherein the signal being detected does not have a 90° phase difference, and FIG. 10B is a wave form diagram showing a state wherein a phase of the signal being detected by a phase adjusting circuit is adjusted.

FIG. 11 is a circuit diagram showing an example of conventional detecting circuit which constitutes the background of the present invention.

DESCRIPTION OF THE PREFERRED EMBODIMENTS

Figure 2A:
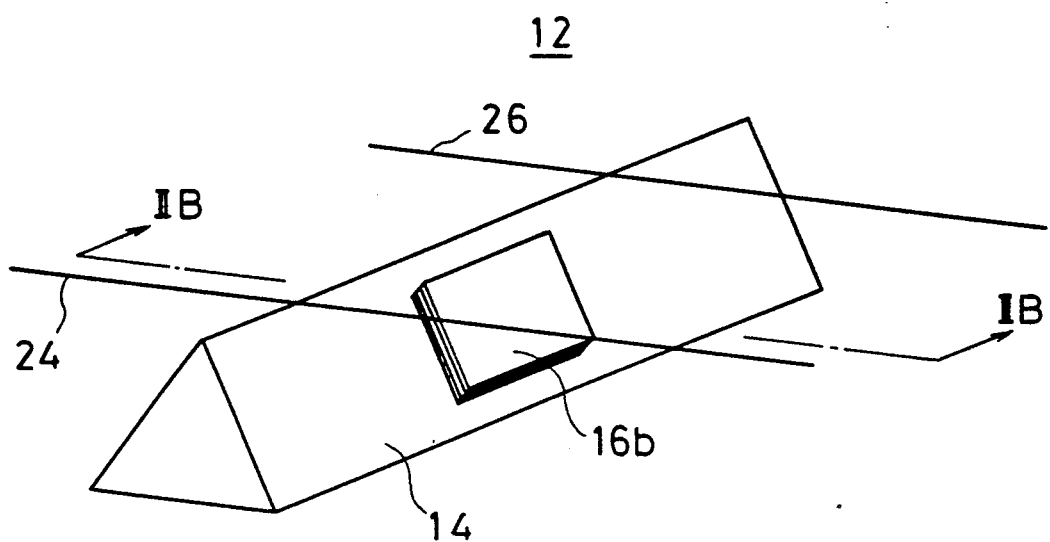
FIG. 2A is a perspective view showing a vibrating gyroscope detected by a detecting circuit shown in FIG. 1.
Figure 2B:
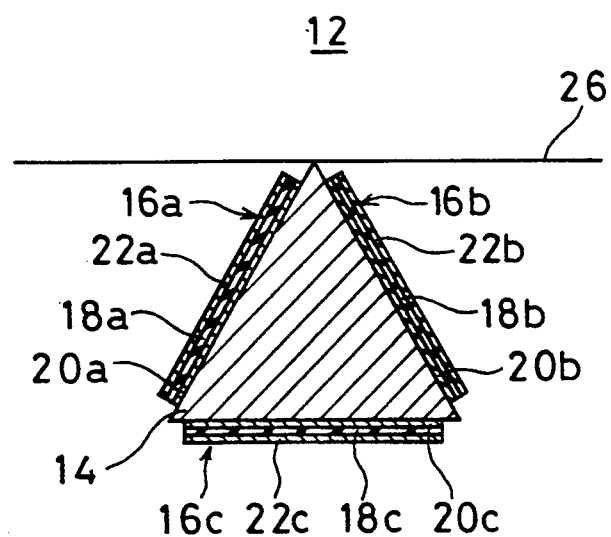
FIG. 2B is a sectional view taken along the line IIB—IIB of FIG. 2A.

FIG. 1 is a circuit diagram showing one embodiment of the present invention. This detecting circuit 10 is used for detecting, for example, the output of a vibrating gyroscope 12. As shown in FIG. 2A and FIG. 2B, the vibrating gyroscope 12 includes, for example, a prism-shaped vibrator 14. The vibrator 14 is generally, formed by materials producing mechanical vibration such as elinvar, iron-nickel alloy, quartz, glass, crystal and ceramics.

On the vibrator 14, piezoelectric elements 16a, 16b and 16c are formed respectively in the center of the three side faces. The piezoelectric element 16a includes a piezoel layer 18a consisting of, for example, ceramics and on the two surfaces of the piezoelectric layer 18a electrodes 20a and 22a are formed respectively. The electrodes 20a and 22a are formed with an electrode material such as gold, silver, alumin nickel, copper-nickel alloy (monel metal) by thin-film techniques such as sputtering and vacuum evaporation or by printing techniques depending on the materials. Similarly, the other piezoelectric elements 16b and 16c also include piezoelectric layers 18b and 18c consisting of, for example, ceramics, and on the two surfaces thereof electrodes 20b, 22b and 20c, 22c are formed respectively. The electrodes 20a-20c on one surface of the piezoelectric elements 16a-16c are bonded to the vibrator 14 by means of conductive adhesives.

Meanwhile, a vicinity of node points of the vibrator 14 is supported by supporting members 24 and 26 consisting of a metal wire. The members 24 and 26 are welded in the vicinity of the node points of the vibrator 14.

A resistance 30 is connected to the piezoelectric element 16a and a resistance 32 is connected to the piezoelectric element 16b. To the resistances 30 and 32, an oscillation circuit output source 36 is connected via a phase correcting circuit 34. The phase correcting circuit 34 and the oscillation circuit output source 36 constitute an exciting signal generating circuit 38. Meanwhile, the oscillation circuit output source 36 is connected to the other piezoelectric element 16c. Thus, an exciting signal is applied between the piezoelectric elements 16a, 16b and the piezoelectric element 16c, thereby the vibrator 14 bends and vibrates in a direction orthogonal to the surface of the piezoelectric element 16c.

Further, the piezoelectric elements 16a and 16b are connected to the input side of a differential amplifying circuit 40, whose output side is connected to a smoothing circuit 46 via a coupling capacitor 42 and a resistance 44. The smoothing circuit 46 is constituted, for example, by two resistances 48, 50 and capacitors 52, 54.

An intermediate portion between the resistance 44 and the smoothing circuit 46 is grounded via a FET 56. When the FET 56 is conducted, the output from the differential amplifying circuit 40 is grounded. Thereby, the unnecessary output signal is not transferred to the smoothing circuit 46 and only the necessary output signal is detected. In order to operate the FET 56, the oscillation circuit output source 36 is connected to its gate via a diode 58. The gate of the FET 56 is grounded via a resistance 60. The FET 56, diode 58 and resistance 60 constitute a synchronous detecting circuit 62.

Figure 3:
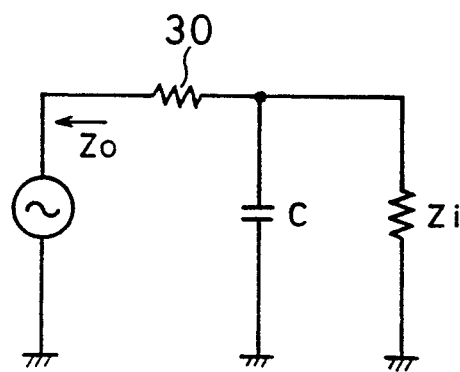
FIG. 3 is an equivalent circuit diagram around a piezoelectric element when the vibrating gyroscope is not rotating.
Figure 4:
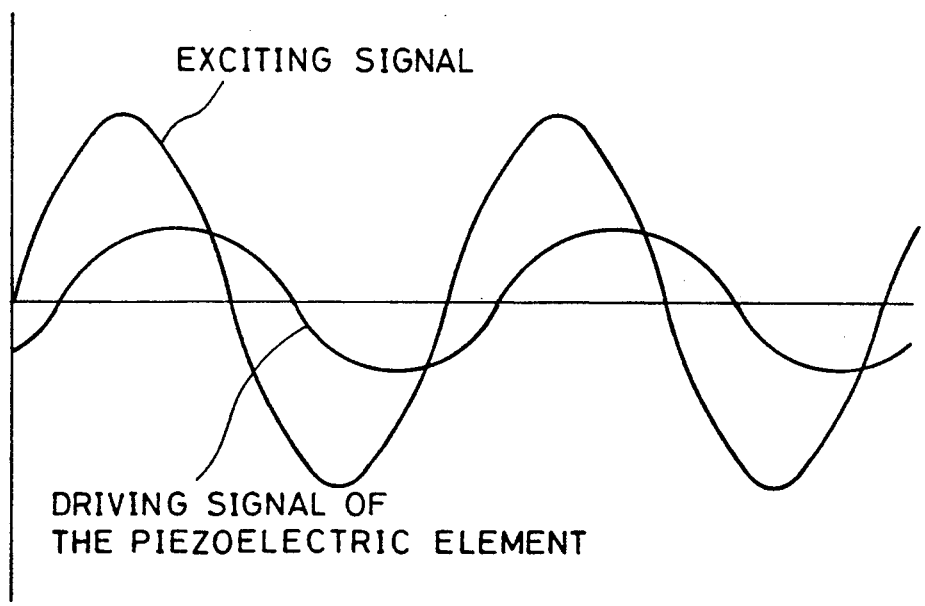
FIG. 4 is a wave form diagram showing a signal wave form of a circuit shown in FIG. 3.

The vibrating gyroscope 12 bends and vibrates in a direction orthogonal to the surface of the piezoelectric element 16c by an exciting signal from the exciting signal generating circuit 38. At this time, regarding the piezoelectric element 16a, its electrical equivalent circuit is as shown in FIG. 3. That is, the resistance 30 is connected to the output impedance Zo of the exciting signal generating circuit 38, and a parallel circuit of electrostatic capacity C of the piezoelectric element 16a and the input impedance Zi of the differential amplifying circuit 40 is connected to the resistance 30. Here, in case the impedance Zc of the electrostatic capacity C of the piezoelectric element 16a is matched to terminal impedance such as the input impedance Zi of the differential amplifying circuit 40, as shown in FIG. 4, a signal delayed by 45° from the exciting signal is outputted by the electrostatic capacity C.

Figure 5:
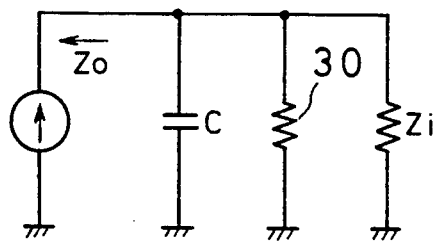
FIG. 5 is an equivalent circuit diagram around a piezoelectric element when a rotational angular velocity is applied to a vibrating gyroscope.
Figure 6:
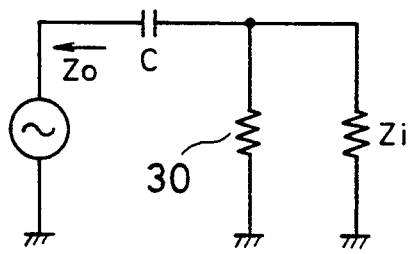
FIG. 6 is an equivalent circuit diagram when a constant-current source of a circuit shown in FIG. 5 is transformed into a constant-voltage source.
Figure 7:
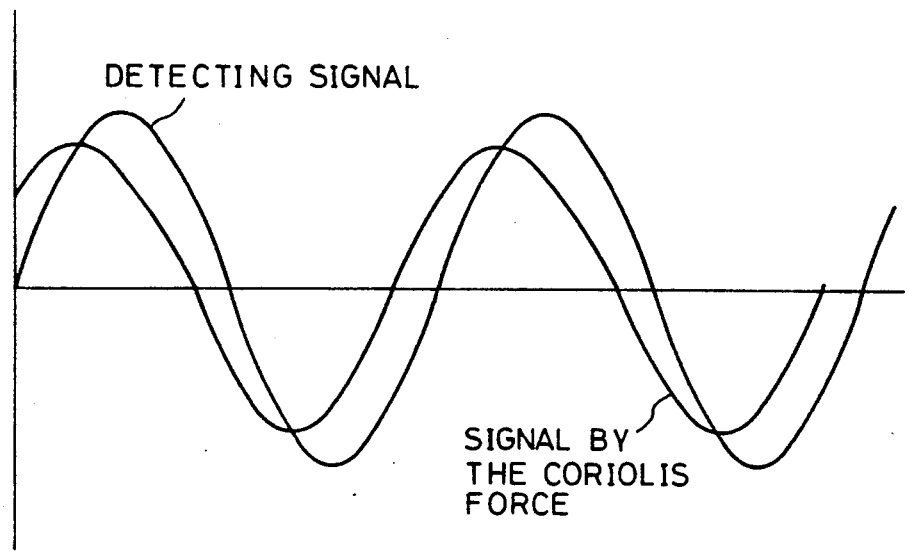
FIG. 7 is a wave form diagram showing signal wave forms of the circuits shown in FIG. 5 and FIG. 6.

Next, when the rotational angular velocity is applied to the vibrating gyroscope 12, the Coriolis force is exerted to produce the electromotive force in the piezoelectric elements 16a and 16b. At this time, the equivalent circuit turns into a circuit having a constant-current source as shown in FIG. 5. When this circuit is transformed into a circuit having a constant-voltage source in as FIG. 3, it turns into a circuit as shown in FIG. 6. That is, the electrostatic capacity C of piezoelectric element 16a is connected to the constant-voltage source, and a parallel circuit of the resistance 30 and the input impedance Zi of the differential amplifying circuit 40 is connected to the electrostatic capacity C. Accordingly, the signal outputted by the Coriolis force leads by 45° as compared with the detecting signal.

Figure 8:
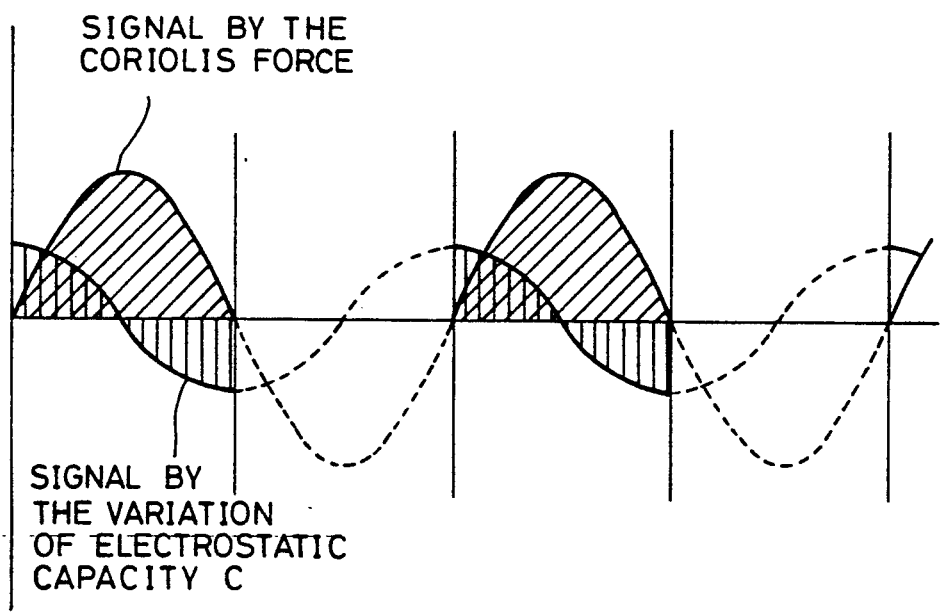
FIG. 8 is a wave form diagram showing the relationship between a signal due to variations of an electrostatic capacity of a piezoelectric element and a signal by the Coriolis force, and a state wherein synchronous detection is conducted.

Accordingly, as shown in FIG. 8, there is the phase difference of 90° between the signal of the electrostatic capacity C at non-rotation and the signal of the Coriolis force at rotation. Thus, the signal having the phase difference of 90° is outputted from the output side of the differential amplifying circuit 40.

Here in the synchronous detecting circuit 62, the signal of the Coriolis force at the positive rotation is synchronized with the positive portion and these signals are detected. In this case, the FET 56 may be conducted at the negative portion of the signal of the Coriolis force as shown in FIG. 8, so that the negative portion is not transferred to the smoothing circuit 46. Accordingly, only the positive portion of the signal of the Coriolis force is smoothed by the smoothing circuit 46, and the rotational angular velocity can be determined by measuring the signal strength. At the negative rotation, it will be appreciated that these signals are detected in synchronism with the negative portion of the signal by the Coriolis force.

At this time, the leakage signal of the exciting signal due to difference of electrostatic capacities C of the piezoelectric elements 16a and 16b is not outputted from the smoothing circuit 46, because the positive and negative portions are offset since there is the phase difference of 90° with the signal of the Coriolis force. Accordingly, even when the electrostatic capacities C of the piezoelectric elements 16a and 16b vary due to the temperature variation and changes with time, a measurement error caused thereby may be eliminated.

As such, when this detecting circuit 10 is used, the rotational angular velocity can be measured accurately by the vibrating gyroscope 12.

In the embodiment stated above, the impedance Zc of the electrostatic capacities C of the piezoelectric elements 16a, 16b and the terminal impedance such as the input impedance Zi of the differential amplifying circuit 40 are matched, as described. However, even when these are not matched, only the phase difference of the respective signals relative to the exciting signal is not 45°. The phase difference between the signal of the electrostatic capacity and those of the Coriolis force is 90°. Accordingly, by selecting the input/output impedance, the phase difference of these signals can be set resulting in a simple circuit configuration.

Figure 9:
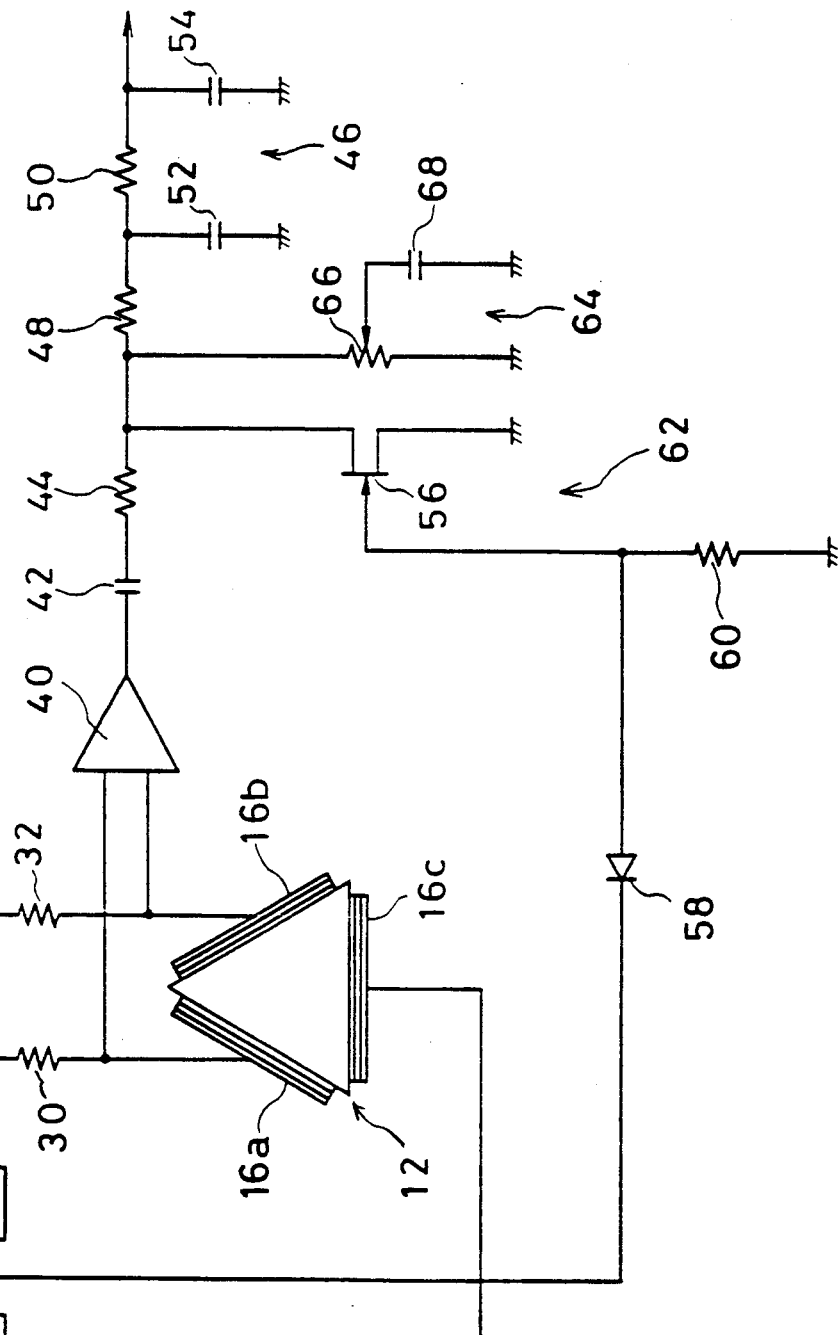
FIG. 9 is a circuit diagram showing another embodiment of the present invention.
Figure 12:
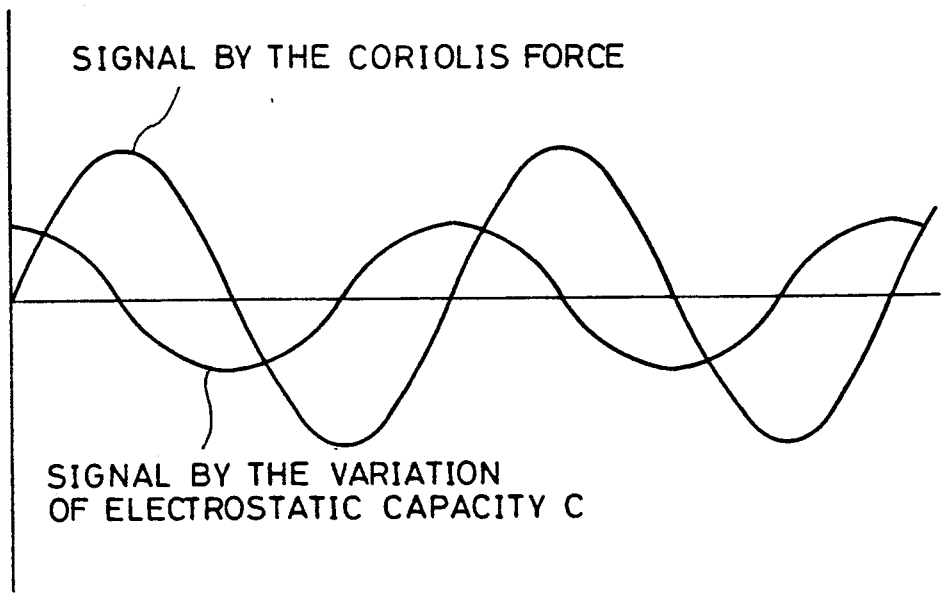
FIG. 12 a wave form diagram showing a signal inputted to a differential amplifying circuit of the conventional detecting circuit shown in FIG. 11.

In some cases, however a slight phase shift is produced between the signal of the electrostatic capacity and those of the Coriolis force. In such cases, as shown in FIG. 9, a phase adjusting circuit 64 is connected to the intermediate portion between the resistance 44 and the smoothing circuit 46. The phase adjusting circuit 64 includes a variable resistor 66 and a capacitor 68. One fixed terminal of the variable resistor 66 is connected to the intermediate portion of the resistance 44 and the smoothing circuit 46, and the other fixed terminal is grounded. A movable terminal of the variable resistor 66 is grounded via the capacitor 68. Through the phase adjusting circuit 64, the phase of the signal being detected by the synchronous detecting circuit 62 is adjusted.

Such a detecting circuit 10 is used when the signal of the electrostatic capacity C of the piezoelectric element 16a and the signal of the Coriolis force do not have the phase difference of 90° as shown in FIG. 10A. In this case, a detecting position is shifted by adjusting the movable terminal of the variable resistor 66, so that the detection is conducted at the position where the signal of the electrostatic capacity C is completely offset as shown in FIG. 10B. Therefore, the signal of the electrostatic capacity C can be completely neglected and the rotational angular velocity can be measured accurately.

While the present invention has been particularly described and shown, it is to be understood that such description is used as an illustration and example rather than limitation, and the spirit and scope of the present invention being determined solely by the terms of the appended claims.

What is claimed is:

1. A detecting circuit for detecting an output of a vibrating gyroscope including, a prism-shaped vibrator and piezoelectric elements formed on, at least, two side faces of the vibrator, said detecting circuit comprising:
   an exciting signal generating circuit for exciting the vibrator by inputting the signal to said two piezoelectric elements;
   a differential circuit for detecting an output difference of said two piezoelectric elements to which the exciting signal generating circuit is connected;
   a synchronous detecting circuit for synchronizing and detecting an output signal from said differential circuit; and
   a smoothing circuit for smoothing the signal synchronized and detected by said synchronous detecting circuit.

2. A detecting circuit in accordance with claim 1, further comprising, a phase adjusting circuit for adjusting phase of the output signal from said differential circuit being detected by said synchronous detecting circuit.

3. A detecting circuit in accordance with claim 1, wherein said synchronous detecting circuit includes a FET for eliminating an unnecessary signal outputted from said differential circuit.

4. A detecting circuit in accordance with claim 2, wherein said synchronous detecting circuit includes a FET for eliminating an unnecessary signal outputted from said differential circuit.

5. A detecting circuit in accordance with claim 2, wherein said phase adjusting circuit is constituted by a variable resistance and a capacitor for adjusting phase of the signal being detected by said synchronous detecting circuit.

6. A detecting circuit in accordance with claim 4, wherein said phase adjusting circuit is constituted by a variable resistance and a capacitor for adjusting phase of the signal being detected by said synchronous detecting circuit.

* * * * *